No. 869,513. PATENTED OCT. 29, 1907.
F. C. PFEIL.
SAW GUARD.
APPLICATION FILED JUNE 17, 1907.
3 SHEETS—SHEET 1.
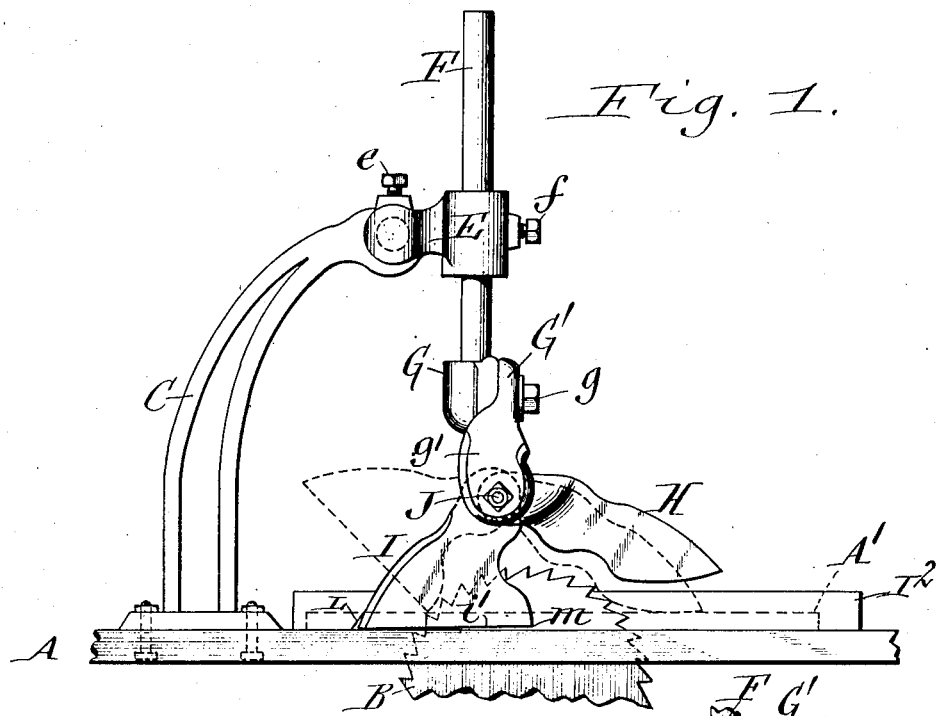
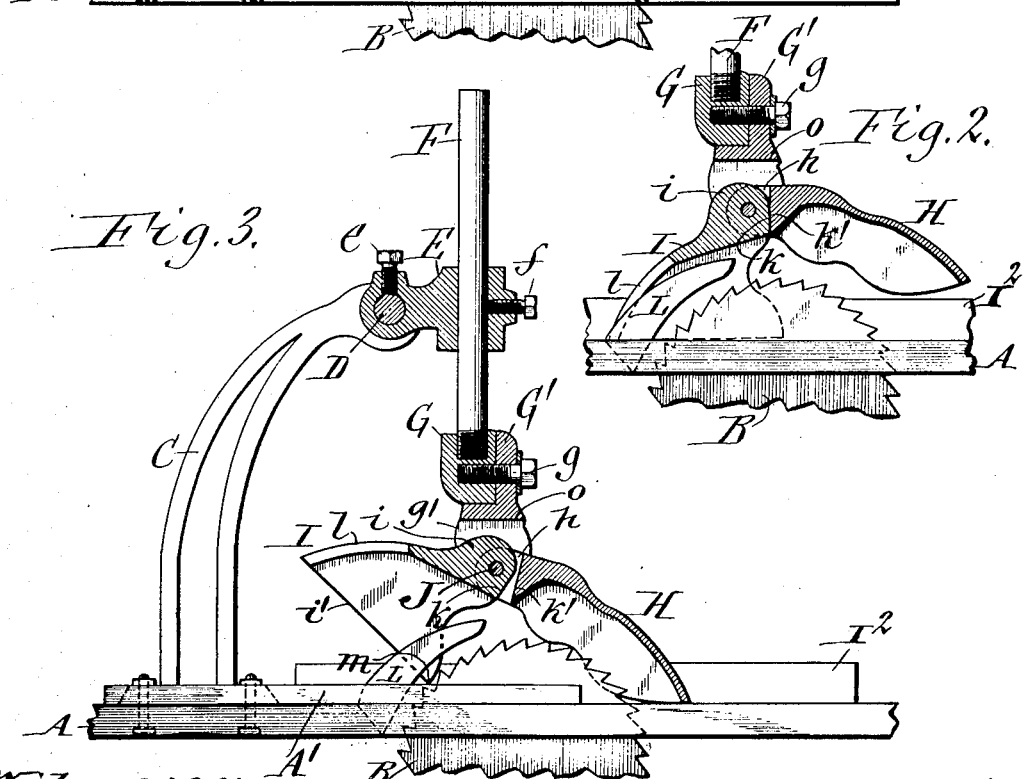
Witnesses:
Gustav W. Hora
Richard Sommer
Inventor
Frederick C. Pfeil
by Geyer & Popp
Attorneys No. 869,513. PATENTED OCT. 29, 1907.
F. C. PFEIL.
SAW GUARD.
APPLICATION FILED JUNE 17, 1907.
3 SHEETS—SHEET 2.
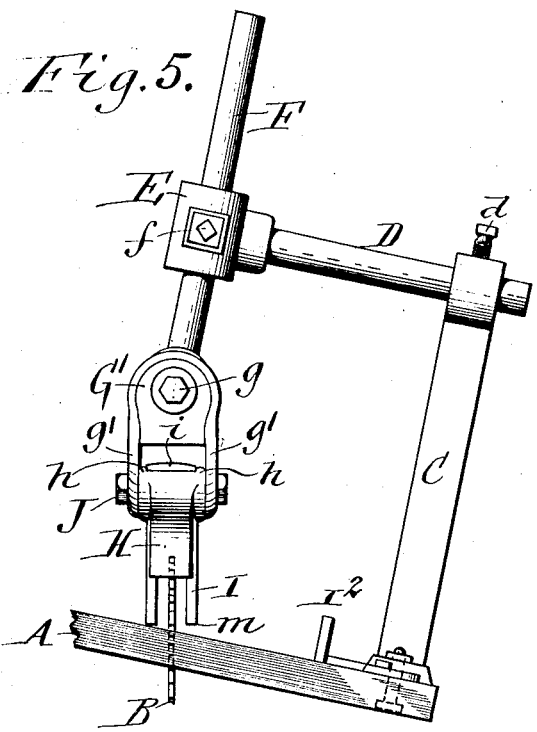
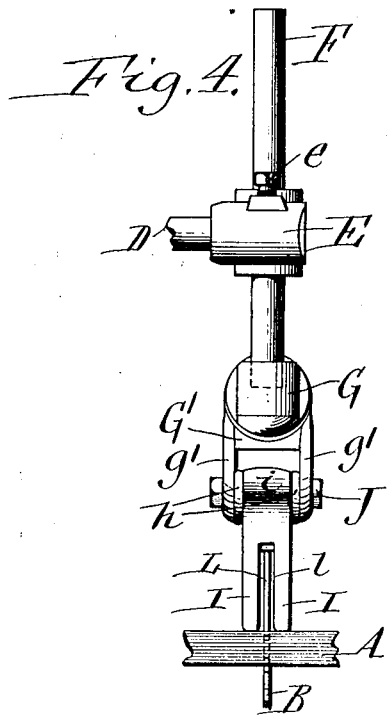
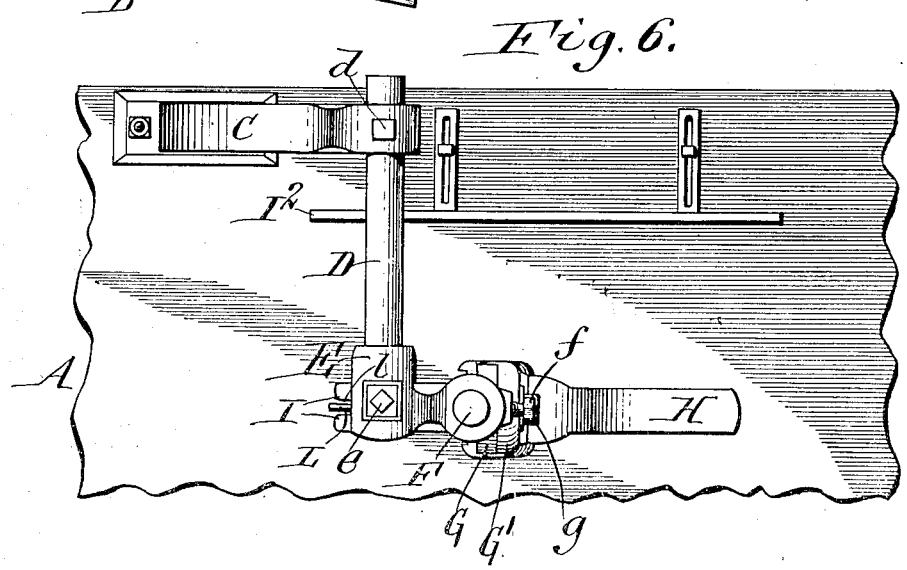
Witnesses:
Gustav W. Hora.
Richard Sommer.
Inventor
Frederick C. Pfeil,
by Geyser & Popp,
Attorneys.

No. 869,513. PATENTED OCT. 29, 1907.
F. C. PFEIL.
SAW GUARD.
APPLICATION FILED JUNE 17, 1907.
3 SHEETS—SHEET 3.
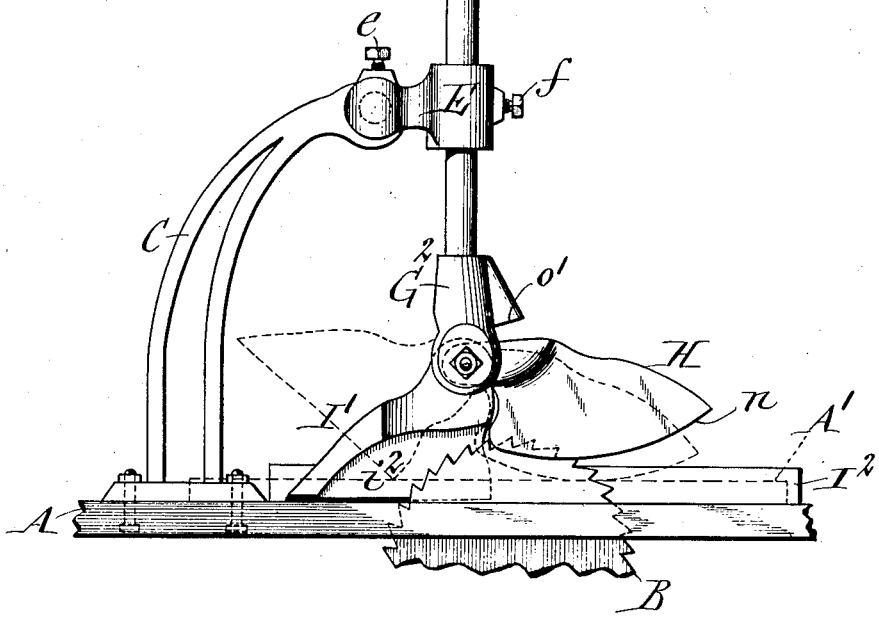
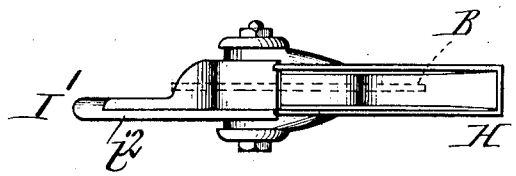

UNITED STATES PATENT OFFICE.

FREDERICK C. PFEIL, OF BUFFALO, NEW YORK.

SAW-GUARD.

No. 869,513.

Specification of Letters Patent.

Patented Oct. 29, 1907.

Application filed June 17, 1907. Serial No. 379,341.

*To all whom it may concern:*

Be it known that I, FREDERICK C. PFEIL, a citizen of the United States, and a resident of Buffalo, in the county of Erie and State of New York, have invented a new and useful Improvement in Saw-Guards, of which the following is a specification.

The object of this invention is to provide an improved saw guard which will positively protect the operator while moving a board past the saw, which is comparatively simple and inexpensive in construction and which can be readily adjusted to saws of different sizes and saws arranged different distances from the side of the saw table and also to different inclinations of the table.

In the accompanying drawings consisting of 3 sheets, Figure 1 is a side elevation of my improved saw guard applied to a circular saw and showing the parts in the position which they occupy when no board is being moved past the saw. Fig. 2 is a fragmentary longitudinal sectional elevation of the same. Fig. 3 is a sectional view taken lengthwise through the saw guard showing the latter in the position which it occupies when moving the rear end of a board past the saw. Fig. 4 is a fragmentary rear elevation of the saw guard and the saw table. Fig. 5 is a fragmentary elevation of the saw guard, saw and table showing the position of the parts when the table is inclined. Fig. 6 is a top plan view of the same. Fig. 7 is an elevation of the saw guard showing a modified construction of the same. Fig. 8 is a bottom plan view of this modified construction.

Similar letters of reference indicate corresponding parts throughout the several views.

Referring to Figs. 1—6, A represents the saw table and B the circular saw which projects with its upper part through a slot in the saw table in the usual manner and which may be rotated by any suitable means common to this type of saws.

C represents a standard secured at its lower end to one side of the saw table and curved upwardly and forwardly at its upper end.

D represents a horizontal rod arranged transversely above the saw and adjustably secured at its outer end in the upper end of the standard by a set screw $d$. At its inner end the horizontal rod has secured thereto by a set screw $e$, a bracket E which projects forwardly from the horizontal rod.

F represents a vertical rod arranged in line with the saw and adjustable vertically in the front end of the bracket E by means of a set screw $f$. At its lower end the vertical rod is provided with a swivel coupling for connecting the shields or hoods of the saw guard with the vertical rod. This swivel coupling, as shown in Figs. 1—6, consists of an upper section G secured to the lower end of the rod F, a lower section $G^1$ adjustably secured by a horizontal longitudinal coupling screw $g$ to the upper section $G^1$, and a pair of supporting hangers $g^1$, $g^1$ depending from the lower section.

H represents a front hood or shield which is constructed to extend over the front part and opposite sides of the saw and I is a rear hood or shield which is constructed to extend over the rear part and opposite sides of the saw, thus forming a casing or inclosure for that portion of the saw above the table which prevents accidental contact with the same from above.

The opposing upper parts of the front and rear hoods or shields are provided with overlapping perforated ears $h$, $i$ which are arranged between the hangers $g^1$ and pivoted thereto by a single transverse bolt J, whereby these hoods or shields are capable of being raised and lowered relatively to the saw table. In the construction of my saw guard shown in Figs. 1—6, the rear shield is made somewhat heavier than the front shield and the joint between the same is so constructed that when the rear shield descends by gravity into its lowermost position, it will compel the front shield to rise from the table and form a space between the top of the table and the lower front part of the front shield through which the board may be moved against the saw, as shown in Figs. 1 and 2. The preferred means for thus causing the downward movement of the rear shield to be transmitted to the front shield for lifting the latter consists of a shoulder $k$ formed on the rear shield adjacent to the front side of its pivot and engaging with a shoulder $k^1$ on the adjacent part of the front shield, as shown in Fig. 2.

In its lowermost position the lower straight side or edge $i^1$ of the rear shield rests upon the table and is arranged substantially parallel with the top of the table, as shown in full lines in Fig. 1. Upon moving a board $A^1$ forwardly between the table and the underside of the front shield and past the saw, the front end of the board engages the lower front edge of the rear shield and moves the latter upwardly and backwardly sufficiently to clear the path of the board. As the board continues its forward movement, the rear shield rests with its lower front corner $m$ on top of the board in rear of the pivot bolt J which corner is made comparatively sharp so that the same acts as a detent pawl or jaw which grips against the upper side of the board and prevents any backward movement thereof but offers no resistance to the forward movement of the board. By this means both sections of the board are prevented from being pulled backwardly by the operator or pushed backwardly by the action of the saw to any considerable extent and thus prevents injury to the operator.

Inasmuch as the rear shield must move forward slightly to grip the board it is possible to pull the latter backwardly sufficiently to clear the saw in case the board becomes pinched and permit of taking a new start in the cut, but at no time permitting the board to be pulled or pushed backwardly to any considerable extent.

The lower straight edge $i^1$ of the rear shield not only serves as a stop to limit the backward or return movement of the rear shield but the same also serves to blunt the corner $m$ and prevent the same from unduly marring or digging recesses in the board should the latter be moved backwardly.

As the rear shield is turned backwardly and upwardly into its gripping or clutching position, it permits the front shield to drop squarely upon the trailing part of the board which positions of the front and rear shields are indicated by dotted lines in Fig. 1. When the front shield thus rests on top of the board the operator is prevented from getting his hands between the board and front shield and following the board to the saw and becoming injured. The front shield is curved from its front end upward and rearwardly which causes the hand of the operator while being moved forwardly with the board to be deflected upwardly and thus prevented from reaching the teeth of the saw.

After the rear end of the board clears the lower end of the front shield the latter drops down on the saw table, as shown in Fig. 3, thereby shutting off access to the saw at the front side thereof and effectually preventing injury to the hands of the operator. After the rear end of the board has cleared the rear shield during its continued forward movement, the rear shield drops by gravity and automatically elevates the front shield preparatory to sawing the next board.

The rear shield is provided with a longitudinal slot $l$ arranged between its side walls and extending upwardly from its lower rear end. This slot permits the rear shield to clear the splitter L which is usually arranged on the table in rear of the saw and operates to hold the sections of the board apart so as to avoid pinching the saw and burning the latter.

It will be noted that in the construction just described both sections of the board which is divided by the saw are held by the two gripping jaws of the rear shield on opposite sides of the saw until the sections have been moved by hand past the rear shield. This construction of guard affords the fullest protection to the operator and is used more particularly when each board is to be cut but once and not returned again to the saw.

In the construction of the front shield shown in Figs. 1—3, each board must be fully cut and fed beyond the rear shield before the front rises and permits another board to be fed to the saw.

°If desired the underside of the front shield may be curved or inclined upwardly, as shown at $n$ in Fig. 7. This permits of feeding boards to the saw one immediately after another, the front or advancing board being engaged at its rear or trailing end by the front or advancing end of the succeeding board, thereby preventing the front shield from dropping and permitting continuous sawing and saving of time and labor. When using a front shield of this character the front end of each board engages with the inclined or beveled face $r$ of the front shield and deflects the same upwardly, thereby preventing the board from being arrested in its forward movement by the front shield.

By raising and lowering the vertical rod F in the bracket E, my improved guard may be adjusted to saws of different diameters and by shifting the horizontal rod transversely in the standard the guard may be adapted to saws which are arranged at different distances from the side of the table. After the guard has been thus adjusted to the table and saw the shields will automatically adapt themselves to boards of different thickness without requiring further adjustment.

When it is desired to tilt the table for sawing boards on an angle the swivel coupling and other parts of the support for the shields are adjusted for holding the shields in the proper position relative to the saw in this position of the table, as shown in Fig. 5.

When a single operator desires to cut strips successively from the same board this may be done rapidly by employing a rear shield $I^1$ which has but one gripping jaw $i^2$ on the gage side of the saw, as shown in Figs. 7 and 8.

In using a guard of this type the operator moves the board forwardly with the right edge abutting against the gage $I^2$ until the rear end of the board clears the saw and is divided. The strip which has been cut off from the board being confined between the saw and gage would be liable to be shot backwardly by the saw and injure the operator but this is prevented by the gripping jaw $i^2$ on that side of the rear shield. The other section of the board on the opposite side of the saw is not so liable to be shot backward by the saw because it is not confined against the same and this last mentioned section may therefore be pulled back by the operator and fed to the saw for cutting another strip therefrom in the manner described during which operation the preceding strip is ejected by the next strip cut from the board. In this manner strips may be cut successively from the board very rapidly and with absolute safety by a single operator thus effecting a saving in the labor usually required for this purpose. When the saw table is non-adjustable a fixed head $G^2$ may be employed for connecting the shield sections with the upright supporting rod F, as shown in Fig. 7.

The upward movement of the front shield of the guard is limited so that the same prevents the operator from being struck by flying strips or breaking saws or becoming blinded by saw-dust. For this purpose the lower section $G^1$ of the swivel coupling is provided on its front side with a shoulder or stop $o$ which is adapted to be engaged by the front shield if the latter is raised above its normal position when struck by a flying strip, a broken saw or saw-dust. In the construction shown in Fig. 7, the head $G^2$ is provided with a stop or shoulder $o^1$ which answers the same purpose.

While effectually preventing injury to the hands of the operator my improved guard does not in any way interfere with the sawing operation, so that the capacity or output of the machine is not reduced by the use of my guard.

I claim as my invention:

1. A saw guard comprising front and rear shields adapted to be supported above the saw so as to be capable of vertical movement, and the arrangement being such as to compel the front section to rise when the rear section descends, substantially as set forth.

2. A saw guard comprising vertically movable front and rear shields adapted to be arranged above the saw, and the arrangement being such as to permit the front shield to descend when the rear shield rises and compel the front shield to rise when the rear shield descends, substantially as set forth.

3. A saw guard comprising vertically movable front and rear shields adapted to be arranged over the saw, the downward movement of said rear shield being limited by engaging with the top of the saw table, and the arrangement being such as to permit the front shield to descend when the rear shield is raised and to compel the front shield to rise when the rear shield descends, substantially as set forth.

4. A saw guard comprising front and rear shields adapted to be arranged above the saw, a pin or bolt pivotally connecting the opposing ends of said shields so that they may swing vertically, and the arrangement being such as to permit the front shield to descend when the rear shield rises and to compel the front section to rise when the rear section descends, substantially as set forth.

5. A saw guard comprising front and rear shields adapted to be arranged above the saw, a pin or bolt pivotally connecting the opposing ends of said shield so that they may swing vertically consisting of shoulders arranged on the shields adjacent to the pivotal connection between the same and adapted to coöperate with each other to permit the front shield to descend when the rear shield rises and to compel the front shield to rise when the rear shield descends, substantially as set forth.

6. A saw guard comprising front and rear shields adapted to be arranged above the saw, a pivotal connection between said shields, and coöperating shoulders on said shields, the relative weight of said shields and the arrangement of said shoulders being such that the front shield is permitted to descend when the rear shield is raised and the front shield is compelled to rise when the rear shield descends owing to the preponderating weight of the latter, substantially as set forth.

7. A saw guard comprising vertically movable front and rear shields adapted to be arranged above the saw and each extending downwardly along opposite sides of the saw, and the arrangement being such as to permit the front shield to descend when the rear shield rises and to compel the front shield to rise when the rear shield descends, substantially as set forth.

8. A saw guard comprising front and rear shields adapted to be arranged above the saw and said rear shield having an angular corner at its lower front end for engaging the board which is being sawed and preventing backward movement thereof, and a support to which both shields are pivotally connected, substantially as set forth.

9. A saw guard comprising front and rear shields, a support to which both of said shields are pivotally connected, the arrangement being such as to permit the front shield to descend when the rear shield rises but compels the front shield to rise when the rear shield descends, and a stop arranged on said support and operating to limit the upward movement of the front shield, substantially as set forth.

10. A saw guard comprising front and rear shields adapted to be arranged above the saw, a swivel coupling consisting of an upper section, a lower section, a horizontal clamping bolt connecting the upper and lower sections and lugs which depend from said lower section and between which both shields are pivotally connected, and a support to which the upper section of the swivel is connected, substantially as set forth.

11. A saw guard comprising front and rear shields adapted to be arranged above the saw, a swivel coupling consisting of an upper section, a lower section, a horizontal clamping bolt connecting the upper and lower sections and lugs which depend from said lower section and between which both shields are pivotally connected, and means for supporting said swivel coupling on an adjustable saw table consisting of a standard adapted to be secured to the table, a vertical rod connected with the upper section of the swivel coupling, and a horizontal rod connecting said vertical rod with said standard, substantially as set forth.

Witness my hand this 13th day of June, 1907.

FREDERICK C. PFEIL.

Witnesses:
THEO. L. POPP,
E. M. GRAHAM.